Figure 1:
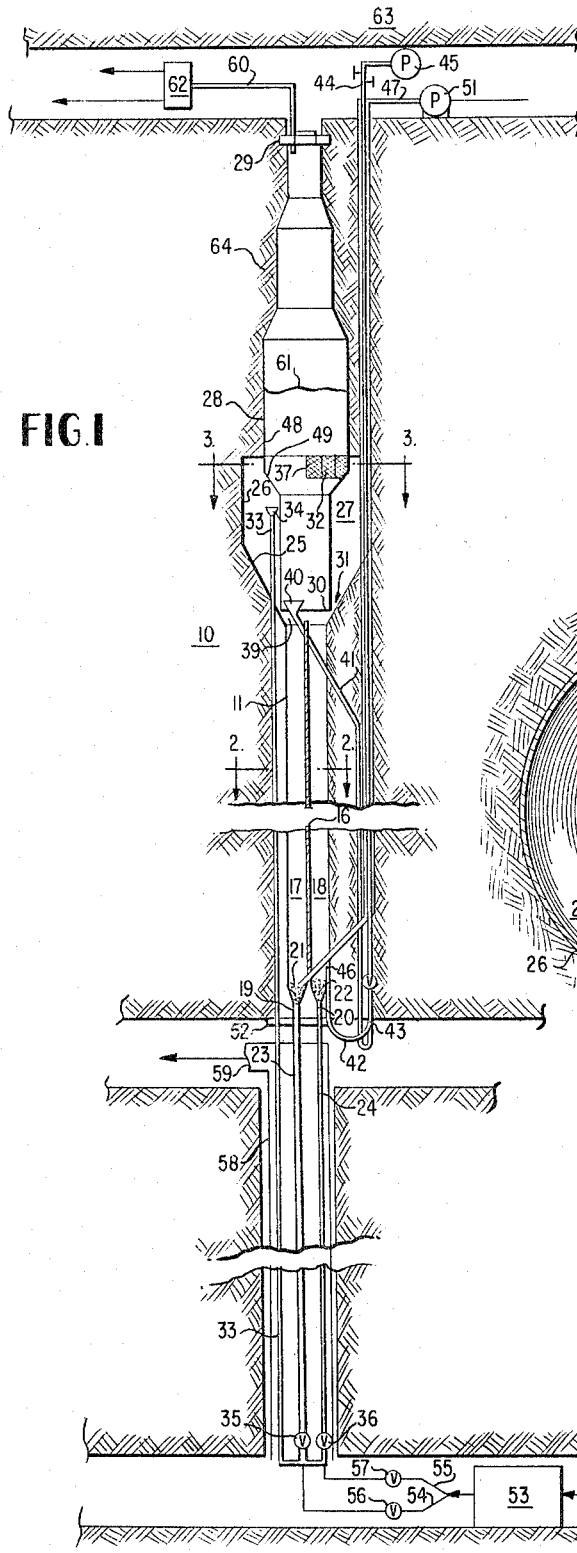

Aug. 2, 1966

P. H. JOHNSON 3,264,099

HYDRO-METALLURGICAL METHOD AND APPARATUS

Filed Jan. 28, 1964

INVENTOR.
PAUL H. JOHNSON
BY
McMorrow, Berman & Davidson
ATTORNEYS

United States Patent Office 3,264,099
Patented August 2, 1966

3,264,099
HYDRO-METALLURGICAL METHOD
AND APPARATUS
Paul H. Johnson, Salt Lake City, Utah, assignor to
Howard E. Johnson & Associates, Oakland, Calif., a
partnership
Filed Jan. 28, 1964, Ser. No. 340,646
16 Claims. (Cl. 75—101)

This invention relates to a hydro-metallurgical method and apparatus for the recovery of metallic values from various materials. More specifically, this invention relates to a high pressure continuous leaching process for recovering metal values from various ores, concentrates and smelter products. This is continuation-in-part of the inventor's earlier filed application, Serial No. 230,184, filed October 12, 1962, now abandoned.

Conventional method for processing metal bearing materials to recover their valuable constituents include techniques such as flotation, gravity separation, chemical leaching at atmospheric pressure, retorting and the like. These methods, generally speaking, do not produce sufficiently high yields of recoverable material, especially when the material to be recovered is found in low percentage in the original component and involves large equipment costs. Although leaching ores and the like at super-atmospheric pressures has previously been attempted, autoclaving processes have not been entirely successful. High cost and poor recovery have been evident in such methods. In addition, conventional autoclaves have not successfully provided for recovery of important by-product values produced during pressure leaching.

Autoclaves are nonetheless used in the mineral processing industry but to a comparatively limited extent. Conventional autoclaves are generally high pressure horizontal vessels having several compartments in which the material to be processed is stirred by motor-driven impellers. In hydro-metallurgical operations, a heated slurry is pumped through the compartments and then withdrawn. Some disadvantages in using conventional autoclaves for hydro-metallurgical processes include inefficient pulp input, ejection and heating. In addition, they require fine dilute feed slurries, lack high mixing efficiencies and as a rule are limited to relatively low pressure and temperature operations. Low grade ores cannot be processed economically since these autoclaves are expensive, relatively small in size and require a great deal of auxiliary equipment for their operation. Furthermore, they do not lend themselves to continuous operation and so their use is often confined to batch processes. The operation of conventional autoclaves also requires high pressure pumping of incoming slurries and the flashing or restriction of outgoing or effluent slurries.

Conventional methods for the treatment of several specific classes of minerals or metal and non-metal bearing compositions have also been found to involve serious drawbacks. For example, arsenopyrite and pyrite gold ores represent a class of ores that have not been commercially significant due to the high cost of recovering values from them. This is primarily due to their refractory nature. Cyanide leaching is impractical in many instances because the gold is very fine and is deeply interlocked in the mineral lattices and because impurities, such as copper and arsenic, are present in excessive amounts. Roasting prior to cyanide leaching is sometimes practical where pyritic gold is treated; however, arsenopyritic gold ores are not treated in such a manner since roasting results in the production of noxious arsine gas.

The average relatively small plant cannot ordinarily afford the expense of a sulphuric acid process of standard design; ferric sulphate is not obtainable as a commodity, and known methods of producing it in the leaching cycle, such as an anodic oxidation, or oxidation with air in an oxidation tower involve the use of expensive equipment and generally are inefficient.

Non-acid autoclave leaching of compositions bearing metal values has not been extensively attempted in the prior art primarily because conventional plant costs have been excessive for the treatment of low grade ores.

A method has also long been sought whereby sulphuric acid-ferric sulphate mixtures could be cheaply regenerated from spent ferrous sulphate. Experiments have shown that ferric sulphate could not be efficiently regenerated by air oxidation under atmospheric pressures without adding a considerable amount of sulphuric acid and heat to the solution, since basic iron sulphates are formed instead of ferric sulphate. In order to attain a small degree of ferric sulphate regeneration or production by prior art methods, it is necessary to use as much as 1200 times the theoretical amount of air required for the oxidation. A great deal of heat is also needed to sustain the reaction.

Ferric sulphate regeneration is commercially successful in large copper leaching plants in which the spent liquor is regenerated and converted to ferric sulphate by anodic oxidation as part of the copper refining step. This method of ferric sulphate regeneration requires a large, expensive plant in addition to large quantities of sulphuric acid. Iron also causes some difficulties in the electrolytic copper precipitation step and must be removed; however, only a small proportion of the iron in solution goes to the ferric form with each cycle through the electrolytic precipitation process. For these reasons, the regeneration of ferric sulphate in this manner is practical only in large scale copper leaching operations.

It is therefore an object of this invention to provide a system for the hydro-metallurgical recovery of metal values wherein the apparatus has a high capacity for low grade materials, can be operated continuously, provides for the intimate contact of solids, liquids and gases, operates on large particle materials, has no moving parts in the reaction zone, has means for adding heat and recovering power from the system, and has heat exchange means for effluent and influent pulp streams. A further object of this invention is to provide means for intimately contacting solids, liquids and gases at a rate proportional to the size of the solids and through a prescribed path so as to provide a sharp time-retention curve for any solid of a given particle size, and means for feeding and withdrawing materials at low pressures to eliminate throttling valve and pump problems.

Additional objects of the invention include the provision of methods for the continuous hydro-metallurgical recovery of metallic values at a high capacity for low grade materials and at high pulp densities.

Another object of the invention is to provide a method for the chemical leaching of sulphide ores and concentrates, the acid leaching of non-sulphide ores where pyrite is added as a source of acid and the leaching of arsenopyrites and pyritic gold ores. The invention also provides a method for leaching ores under autoclave conditions where free agents other than natural sulphides are used. A further important object of the invention is to provide a method for the production of low cost sulphuric acid-ferric sulphate leach solutions from pyrite and spent leach liquors.

Other objects of this invention include methods for the hydro-metallurgical recovery of metal values from minerals by continuously leaching high or low grade, crude, fine or coarse particle ores in large tonnages under conditions of severe agitation and high pulp densities, temperature and pressure.

The objects of this invention also include a method for leaching individual particles of a material containing metal values of a mixed particle size for a duration proportional to the particle size of the material.

This invention also has as its object the hydro-metallurgical treatment of mixed particles of material bearing metal values in such a manner so as to have a sharp time-retention curve whereby each particle traverses a long path in order to be exposed to maximum refining conditions and whereby a particle of a given size will not be treated for too great or too short a period of time.

Additional objects of this invention include providing methods and apparatus for the recovery of metal values from non-sulphide, sulphide and sulphide-oxide ores and concentrates by acid or pyrite leaching so as to eliminate usual smelter operations and the huge capital investments involved therein, and to provide marketable metal salts or metals at or near the mine-site, thus eliminating the shipping cost of bulky concentrate products to smelters. The invention also provides methods and apparatus to recover golds, silver and extremely fine, pure iron ochre from ores and concentrates and to obtain by-product sulphuric acid-ferric sulphate solutions and accessory metals, such as bismuth and tellurium in marketable forms.

The invention also provides a method and apparatus for the breakdown of sulphides for gold recovery whereby pyritic and arsenopyritic gold ores can be treated inexpensively, and consumption of cyanide in subsequent cyanide leaching steps can be reduced.

This invention also has for its object the generation of large quantities of inexpensive, high quality leaching reagents from pyrite spent leach liquors. The reagents thus obtained are useful in leaching oxide and sulphide ores under conventional atmospheric leach conditions in addition to in-situ acid leaching of sulphide bearing ores.

Other objects of the invention include the recovery of gold, silver, copper, zinc and high grade iron ochre in addition to and during the manufacture of leach solutions from pyrite.

The manner in which the above objects and many other highly desirable advantages are achieved will be apparent from the following description of the invention considered in the light of the accompanying drawing.

The autoclave of this invention operates in a substantially vertical position and can be placed underground to utilize the solid rock or earth formations of the surround-environment as a means of support theerby enabling it to withstand extraordinarily high internal pressures and temperatures. Solids and fluids, such as liquids and gases are introduced into the vessel and are agitated by means of a liquid-air fluidization action wherein a suitable gas and liquid, such as clarified leach liquor, are forced upward through the bed of solids to be treated. The upward flowing liquid acts to dilate the bed of solid material and also provides the liquid medium needed for the chemical extraction. Concurrently, the gas causes the solution to move upward through the bed by an airlift principle and provides the reactant such as oxygen needed for the subsequent reaction. The gas movement also causes violent agitation and particle movement and carries the particles of material through a prescribed path.

The pulp or material to be treated flows into and out of the vessel via a unique low pressure heat exchange system.

The novel autoclave of this invention is capable of continuous operation and has a high capacity for low grade materials, operates at high pulp densities during leaching, provides intimate contact of solids, liquids and gases and may operate on coarse (minus 10 mesh) material.

The system has no moving parts within the corrosive leaching zone and is capable of passing material through the reaction zone at a rate proportional to the size of the material. The particles of the material are directed over a prescribed path in going through the vessel thereby giving a sharp time-retention curve for a given particle size.

In addition, effluent and influent pulp streams enter and leave the autoclave under low pressure, thereby eliminating throttling valve and pump problems. The autoclave also provides for excellent heat exchange of the effluent and influent pulp streams in addition to means for adding heat to the system and for recovering power from the system in the form of heated and expanded compressed air containing significant quantities of steam. The cost of the autoclave and its operation are extremely low by comparison to conventional methods and equipment.

The apparatus and process of this invention are applicable to the leaching of sulphide ores and concentrates, acid leachable non-sulphides where pyrite or pyrites plus return pregnant leach liquor containing iron sulphates is added as a source of acid. Arsenopyrite and pyritic gold ores and ores leachable under autoclave conditions wherein reagents other than natural sulphides are used may also be leached according to this invention. The invention also lends itself to the manufacture of sulphuric acid-ferric sulphate leach solutions from pyrites and/or spent leach liquors containing iron sulphates.

Sulphide ores of copper and zinc responded well to leaching in the underground autoclave. Excellent results were obtained in a pyrite leach of a calcareous beryllium ore from the Topaz Mountain, Utah, area. 100% recovery was obtained on a minus 14 mesh feed in one-half hour of leaching at moderate pressures and temperatures and the pregnant solution produced was high in beryllium and extremely low in contaminants, such as aluminum, iron and zinc.

Pyrite in combination with spent iron sulphate leach liquors was found to oxidize under low pressures and temperatures and at high efficiencies and reaction rates to form a high grade acid-ferric sulphate solution. The solution was found to be ideal for the leaching of oxide and sulphide ores under atmospheric leach conditions.

In addition to leaching low grade crude ores of many different types, the apparatus and method of the present invention are applicable to the treatment of high grade ores in large tonnages under conditions of severe agitation, at high pulp densities, a particle size of minus 10 mesh and under pressure and temperature conditions considered severe for conventional autoclave processes.

The material to be treated by the invention can be processed in a mixed particle size feed for a duration proportional to the size of each particle in the mixed feed. Furthermore, the present invention also makes it possible to recover as much as or more power from the system than that put into it in the form of compressed air.

The method and apparatus of this invention are also amenable to non-acid leaching process. Leaching gases, such as ammonia and sulphur dioxide are also employed in the underground autoclave for the hydro-metallurgical leaching of metal values from metal bearing compositions by recycling the gas as it comes off the top of the vessel through a booster compressor and then through the bottom of the bed along with a new supply of leaching reagent. Other reagents, such as NaOH, $Na_2CO_3$,

$NaHCO_3$, HCl are also effective leaching agents for specific types of ores under autoclave conditions.

More specifically, the underground autoclave can be employed for leaching of sulphide minerals that disassociate in aqueous solution under elevated oxygen or air pressures and at temperatures above 100° C. to form soluble metal sulphates, iron oxides or basic iron sulphates and sulphuric acid. These sulphide or sulphide-oxide ores contain either chalcopyrite or pyrite. The sulphur contained in these minerals is converted to sulphuric acid by air oxidation in aqueous solution. The acid thus produced is generally sufficient for leaching the sulphide or acid soluble sulphide-oxide ores. Sulphide or sulphide-oxide ores can be leached directly at the mine-site with the advantage that smelter and melt plants which represent a huge capital investment can be replaced to a great extent by the relatively inexpensive apparatus of this invention.

The process and apparatus of this invention are also applicable to leaching non-sulphide ores, concentrates and smelter products by using pyrite or pyrites plus return leach liquor containing iron sulphates as leach agents. This method comprises adding pyrite or pyrites plus spent liquor as reagents to the inflowing pulp to act as a source of acid or acid-ferric sulphate. At temperatures above 100° C. and under elevated oxygen partial pressures, pyrite iron sulphates decompose to form variable amounts of acid-ferric sulphate according to the temperature of the reaction and the composition of the return leach liquor, if used. The acid-ferric sulphate leaches the oxide ores of their oxide metal content. High leach temperatures and oxygen pressures promote the fast dissolution of metals with relatively low acid or pyrite concentration and effect very selective recoveries under certain circumstances.

By employing this method, the cost of leaching agents can be reduced. For example, pyrite costs about $5.00 per ton at the mine-site and in some instances contains sufficient quantities of gold, silver and ochre which can be recovered from the pyrite to further reduce the overall cost. This cost compares favorably to the $30.00 to $40.00 per ton price of sulphuric acid at the mine-site. Furthermore, in many instances, one pound of pyrite under autoclave conditions is often equivalent to two pounds of sulphuric acid.

Pyrite leaching results in the production of a pregnant solution of higher quality than that produced with high acid strength solutions under atmospheric leach conditions. At temperatures above 150° C. iron, aluminum and some of the other impurities commonly found in gangues are insoluble under autoclave acid leach conditions which would account for this phenomena.

Coarse pulps and the lower acid content of the leach liquor facilitate solids liquid separation as compared to the problems encountered when leaching fine pulps under high acid conditions at atmospheric pressure.

Arsenopyrites and pyritic gold ores are also treated by the process and apparatus of this invention. Both the arsenic and iron in the sulphide minerals form insoluble oxide products that precipitate from solution when subjected to the present autoclave leach conditions.

The gold values can then be recovered from the fine residue by either cyanide leaching, gravity concentration or amalgamation. The gold values can be separated from either the slimes or the coarse residue products or alternately both slimes and residue products can be treated in this manner. The gold responds readily to treatment by these techniques, since most of the cyanide consuming elements have been removed by the autoclave leach process. Where pyritic gold is treated and no insoluble arsenates are formed, the slime product in some instances contains sufficient quantities of gold concentrates so that further separation is not required at the mine-site.

By employing this method, the cyanide consumption and the time for subsequent cyanide leach steps can be reduced as compared to the amount of cyanide originally needed to leach the sulphide ore. This is primarily due to the fact that cyanide consuming elements are substantially leached from the residue product by treatment in the underground autoclave.

The underground autoclave can be used for the generation of large quantities of acid-ferric sulphate liquors containing up to 10% $H_2SO_4$ (sulphuric acid) and 20% $Fe_2(SO_4)_3$ (ferric sulphate) from pyrite and spent leach liquors containing a small amount of sulphuric acid (about 1%) and ferrous and ferric sulphates (up to 5% total iron). The main reactions involved in generating sulphuric acid and ferric sulphate from pyrites and spent leach liquor containing iron sulphates in the present underground autoclave system are as follows:

(1) $2FeS_2 + 7O_2 + 2H_2O = 2FeSO_4 + 2H_2SO_4$ (2) $4FeSO_4 + O_2 + 2H_2SO_4 = 2Fe_2(SO_4)_3 + 2H_2O$ (3) $10FeSO_4 + O_5 = 3Fe_2(SO_4)_3 +$ $Fe_4SO_9$ (insufficient $H_2SO_4$ present)

and (4) $Fe_2(SO_4)_3 + 3H_2O = Fe_2O_3 + 3H_2SO_4$

By controlling certain operating variables such as oxygen partial pressure, temperature of reaction, amount of air passing through the vessel, the quality and quantity of spent leach liquor solution in respect to the amount of pyrite present, leach duration, etc., it has been found possible to convert either a small or large proportion of the iron sulphates in the spent leach liquor to sulphuric acid and ferric sulphates and, by the contribution made by the dissolution of pyrite in the system, to maintain high quality liquors. When the spent sulphate leach liquors are largely regenerated to the acid form (Equations 2, 3, and 4) and pyrites contribute but very little to the system (Equation 1), the ratio of pyrite consumed to acid produced may be as high as 1:6 whereas, when most of the sulphate in the leach liquor produced is supplied by the pyrite present, the ratio may be as low as 1:1. By this regeneration of spent reagent, it is possible to generate up to 100 tons of sulphuric acid-ferric sulphate reagent (equivalent to concentrated 100% reagent) from 10 tons of pyrite plus spent leach liquor in a very small underground autoclave plant. One hundred tons of this reagent (equivalent to concentrated reagent) is adequate to leach between 1000 and 5000 tons of average copper oxide-sulphide ore containing one percent copper.

Typical leaching reactions where ferric sulphate is used to leach oxide and sulphide ores under atmospheric leach conditions are:

(5) $Cu_2S + 2Fe_2(SO_4)_3 = 2CuSO_4 + 4FeSO_4 + S$ (6) $ZnS + Fe_2(SO_4)_3 = ZnSO_4 + 2FeSO_4 + S$ and (7) $3CuO + Fe_2(SO_4)_3 = 3CuSO_4 + Fe_2O_3$ When copper is precipitated from solution by cementation, the reaction is:

(8) $CuSO_4 + Fe = FeSO_4 + Cu$

In some cases, as for instance prior to cementation, it is desirable to convert the ferric sulphate contained in the acid-ferric sulphate leach liquor to the ferrous sulphate form. This can be accomplished by passing the leach liquor over or through a bed of pyrite wherein the ferric iron is reduced to the ferrous state and an addition of sulphate ion is made to the liquor in the form of sulphuric acid and ferrous sulphate. This reaction is:

(9) $7Fe_2(SO_4)_3 + FeS_2 + 8H_2O = 15FeSO_4 + 8H_2SO_4$

Thus, ferrous sulphate is produced in the spent leach liquor by the reactions represented by Equations 5, 6 and 8 prior to its recycling to the underground autoclave where, by the reaction of Equations 1, 2, 3 and 4, it is regenerated to the acid-ferric sulphate form.

In this process, pyrite and air which are very cheap and abundant products, are the only reagents consumed.

Since limestone (calcium carbonate), iron, magnesia and alumina minerals are less soluble in ferric sulphate than in sulphuric acid, oxide or sulphide-oxide ores may be leached with a medium strength sulphuric acid-high strength ferric sulphate solution with the result that a smaller percentage of these compounds will dissolve in the pregnant leach solution and more efficient use will be made of the sulphuric acid present in the leach liquor. When the sulphuric acid in the leach solution is consumed by limestone, iron, magnesia and alumina, the pH is increased to about 2 or 3 and the ferric sulphate will continue to leach the ore selectively until it is consumed by the recoverable metal values.

Cementation of copper from a pregnant solution, conversion of ferric sulphate to ferrous sulphate in the leaching of some minerals and the leaching of some iron minerals by the sulphuric acid present in the leach solution provides a recycle iron sulphate solution with adequate amounts of iron sulphate for regeneration.

The advantages of this process include the generation of large quantities of inexpensive, high quality leaching solutions capable of leaching most oxide and sulphide ores under conventional atmospheric leach conditions as well as in-situ leaching of ores.

In the case of acid-ferric sulphate generation from pyrites and iron sulphate solutions, the amount of leaching agent produced from the decomposition of a pound of pyrite can be increased several times over the amount possible by the simple decomposition of pyrite alone in aqueous solution. Furthermore, a leaching agent is produced that is not consumed by calcareous and basic gangues to the extent that sulphuric acid is thereby reducing the amount of reagent consumed per pound of metal recovered. High strength leaching solutions are also produced that are capable of leaching many sulphide minerals under atmospheric conditions.

Numerous tests in the underground autoclave have shown that by controlling reaction conditions, such as temperature, pressure, pulp density, the amount of iron sulphate in the recycle liquor, the relative amount of pyrite and the sulphuric acid content of the leach liquor, there can be obtained either relatively high strength sulphuric acid-low strength ferric sulphate solutions (75 g./l. $H_2SO_4$, 15 g./l. $Fe_2(SO_4)_3$) or medium strength sulphuric acid-high strength ferric sulphate solutions (50 g./l. $H_2SO_4$, 120 g./l. $Fe_2(SO_4)_3$). A typical high acid-high ferric sulphate solution, produced in such a manner comprises 75 g./l. sulphuric acid and 120 g./l. ferric sulphate and 5 g./l. ferrous sulphate.

Essentially, almost all of the sulphur introduced into the system in the form of fine pyrite and iron sulphate can be converted to the acid-ferric sulphate leach liquor product after about 90 minutes of leaching under relatively mild conditions. (Air pressures in the range of 125 to 40 p.s.i. and temperatures in the range of 130 to 170°.)

Three to ten tons of sulphuric acid-ferric sulphate reagent (equivalent to concentrated reagent) can be generated for each ton of pyrite (43% sulphur) consumed with a slight excess of the theoretical quantity of air required to completely oxidize the pyrite. In addition, the pyrite provides the heat necessary for the reaction. In some instances, the residue obtained after separation from the acid-ferric sulphate solution is enriched from about twice to four times its original value in gold and silver which is suitable for cyanide leaching. The ferric oxide residue or ochre after gold and silver are removed is very pure and can be marketed directly.

According to this invention, it is also possible to operate the autoclave so that the acid-ferric sulphate solution can leave the underground autoclave as a heated solution requiring slime ferric oxide separation. Because the solution is hot and acidic, the ferric oxide flocculates and settles from the solution quite readily. The deslimed ferric sulphate-acid solution can then be used to leach metal containing compounds under atmospheric conditions and inasmuch as the solution is warm, its sulphide leaching capabilities are considerably greater.

The sulphuric acid-iron sulphate generated in the underground autoclave, when evaporated to a solid form, can be used as a soil conditioner for alkaline soils.

Figure 2:
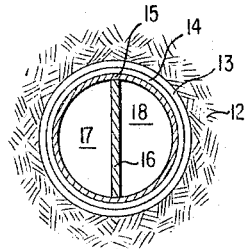
Figure 3:
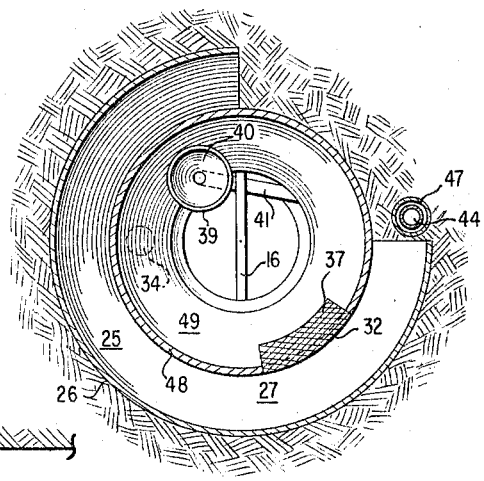

In the accompanying drawing:

FIGURE 1 is a side, cross-sectional view of a continuous leaching system in accordance with the present invention, FIGURE 2 is a cross-sectional view taken along the line A–A' of FIGURE 1, and FIGURE 3 is a cross-sectional view taken along the line B–B' of FIGURE 1.

The preferred embodiment of the autoclave 10, illustrated in FIGURE 1, comprises a substantially vertical reaction vessel 11 in which the leaching solutions and the metal bearing materials are contacted.

As may be seen by reference to FIGURE 2, a cross-sectional view along line A–A' of FIGURE 1, the wall 12 of reaction vessel 11 may be a rock or earth formation in which the vessel is constructed. The vessel wall 12 is preferably lined with a layer of pumice concrete 13, a layer of a sheet steel bonded to lead 14, and an inner layer of silica brick 15. Other combinations of heat resistant and anticorrosive materials may be used to line the walls of the reaction vessel.

In the preferred embodiment, shown in FIGURE 1, the reaction vessel 11 is divided by a vertical baffle or partition 16 into separate zones or sections 17 and 18. At the bottom of sections 17 and 18 are inlet ports 19 and 20 respectively, through which leaching fluids may be introduced into the separate sections of the reaction vessel. Beds of metal shot, such as titanium shot, 21 and 22 act as seals to prevent solids back-flow into fluid conduits 23 and 24 which feed sections 17 and 18 respectively.

In an alternate embodiment of the invention, baffle 16 may be omitted from the structure. In that case, only one fluid inlet port and one fluid feed conduit will be required in the bottom of the reaction vessel.

At one point, the wall 12 of reaction vessel 11 is flared out to form an enlarged chamber which is substantially concentric with the section vessel. In FIGURE 1, this region is formed by frusto-conical wall section 25 and cylindrical wall section 26 which has a greater diameter than that of the major portion of wall 12.

Positioned within and spaced from the enlarged chamber 27 is a continuation of the reaction vessel 11. This upper section 28 is closed by a bulkhead 29 which may be of concrete and steel and which is designed to resist very high pressures. The bottom periphery 30 of upper section 28 is spaced slightly from frusto-conical wall section 25 so that five solids may pass through the space 31 and be returned to the reaction vessel.

A window or aperture 32 in the wall of upper section 28 provides communication between the inside of section 28 and chamber 27. A metal screen 37 or mesh is preferably located in the aperture 28 and this screen may serve to separate coarse solids from the liquid flowing through the aperture, thus helping to clarify the pregnant leach liquor.

A solution recirculation conduit 33 has an intake 34 situated in the chamber 27 and communicates through valves 35 and 36 with conduits 23 and 24, respectively. The conduits in turn feed into reaction zones 17 and 18 through inlet ports 19 and 20.

A fine solids removal device 39 is located near the bottom periphery 30 of upper section 28 of the reaction vessel. This device may comprise a dished table or shelf 40 onto which a portion of the fine solids in the system are deposited by gravity. The fine solids are then withdrawn through conduit 41.

Conduit 41 joins conduit 42 at junction 43 and the solids are then pumped out of the system through conduit 44 by means of pump 45. Conduit 42 carries coarse solids removed from the bottom of zone 18 through port 46.

Conduit 44 is preferably in heat exchange relationship with pulp feed conduit 47 so that heat from the withdrawn slurry may be imparted to the input slurry to promote the leaching reactions.

Referring briefly to FIGURE 3, a cross-sectional view taken along line B–B' of FIGURE 1, it is seen that the enlarged section 27 extends about three-fourths of the way around upper section 28.

Aperture 32 in upper section 28 containing screen 37 is located at the junction of cylindrical wall section 48 and conical wall section 49 of section 28. Table 40 of the fine solids removal device 39 and conduit 41 leading from table 40 are seen to be situated within the portion of section 28 defined by cylindrical wall section 50 which has a smaller diameter than cylindrical section 48.

In this view, intake 34 of leaching solution recirculation conduit 33 is obscured by conical wall section 49 but its location is indicated by a dotted line.

The metal bearing ore or other material is ground in a rod mill or the like and is fed by pump 51 through pulp feed conduit 47 into the bottom of reaction zone 17. The ground ore is preferably slurried with water or leaching solution prior to introduction into the autoclave.

A lower concrete and steel bulkhead 52 is situated below the reaction vessel 11 to withstand the high pressures generated during the leaching operation.

Air or other gas is compressed in booster compressor 53 and is fed through conduits 54 and 55 and valves 56 and 57 to conduits 23 and 24. The gas-solution mixture is then fed into zones 17 and 18 where it provides a combined agitation and gas-lift effect to the solids. Leaching of values from the solids is thereby greatly enhanced.

A heating chamber 58 is provided around conduits 33, 23 and 24 to preheat the fluids before introduction into the autoclave. Any suitable heating means may be employed. A pump or pumps (not shown) may also be incorporated in line with conduits 23 and 24 to assist in forcing the solutions and gases up through zones 17 and 18.

Where a combustion heater is used in chamber 58, exhaust gases may be removed through outlet 59.

A gas offtake conduit 60 is provided above the liquid level 61 in the autoclave and serves as an outlet for the compressed gases introduced with the leaching liquid in the bottom of the reaction vessel and also for other gases that may be generated during the leaching. The conduit may suitably extend through bulkhead 29 and may be used to drive a turbine generator 62 or may be recycled to the mine or to the leaching system itself.

It will be apparent that the entire system may be constructed below ground level 63 and it is important that the reaction vessel 11 of the autoclave be supported in an earth formation 64 such as rock, so that the leaching can be conducted under conditions of high temperature and pressure without danger of explosion.

OPERATION OF THE AUTOCLAVE SYSTEM (A) *Gas flow.*—Gases that would normally flow to mine tools within the mine at approximately 100 p.s.i. are compressed to 250 to 600 p.s.i. by booster compressor 53 located near the bottom of the solution circulation lines 33, 23 and 24. Gas is injected into lines 23 and 24 through valves 54 and 55, preferably immediately after compression and without after-cooling, although the gas can be cooled, if necessary. The gas then proceeds up through the two solution circulation lines 23 and 24 and through the injection ports 19 and 20 at the base of the split reaction zones 17 and 18.

In the case of the alternate embodiment in which there is no baffle 16 or lower solids drawoff port 46, the gas and leaching solution enter the base of an undivided reaction chamber. The slurry of solids lifted up through vessel 11 may then be pumped off through single or multiple collection devices, such as 39, situated in the upper section or elsewhere in the vessel.

After passing through the full length of the autoclave, the gas is then vented out of the top of the vessel through line 60 and into the turbine generator 62 for power recovery. The deoxygenated air or other gas effluent is at approximately 100 p.s.i. and can still be used to run mine tools by known methods. As the gas passes through the autoclave, it becomes heated, expanded, mixed with steam and is deoxygenated if the gas originally contained any oxygen.

The gas or air circulated through the autoclave in the above manner can act not only to oxidize the minerals in the pulp mass, but also agitates the pulp, lifts the leaching solution through the bed of solids and imposes a pressure on the system. Where the gas contains oxygen this also results in an increased oxygen partial pressure, which produces higher reaction temperatures than are obtainable under atmospheric conditions. Additionally, the gas or air circulated through the autoclave facilities ejection of solid material or pulp from the system.

(B) *Solution flow.*—Water or other suitable leaching solutions may enter the system with solids as a component of a feed slurry from a rod mill or other grinding device suitable for reducing the size of the ore or material to be treated. Pump 51, which may be located at or close to the ground surface 63 several hundred feet above the vessel proper, delivers the feed to the heat exchange means comprising concentric pipes 47 and 44. Inasmuch as the column of solids below the pump is of considerable height, it imparts a head on the contents of the autoclave, and pump 51 consequently works under relatively low pressures. Therefore, valving down apparatus on the effluent pulp line can be eliminated. Liquid in the feed slurry enters zone 17 of the reaction vessel on one side of the partition 16 and is mixed with recirculated solution and gas. The latter enters through ports 19 and 20 on both sides of the brick baffle 16.

The gas lift effect provided by the compressed gases introduced into conduits 37 and 38 together with the input of leaching solution or water tends to carry the pulp solids upwardly within zone 17. The solution also flows upwardly in zone 18. As previously noted, pumps may be incorporated in lines 23 and 24 to assist this flow.

As the solutions reach chamber 27 of reaction vessel 11, a portion enters intake 34 of conduit 33 and this clarified pregnant liquor is recirculated to conduits 37 and 38. Other portions of the leaching solution are drawn off with the fine solids collected through the fine solids removal device 39 and the rest is removed with the coarse solids withdrawn through port 46 and conduit 42. These portions are combined at the conduit junction 43 and are then pumped out through the solids slurry effluent conduit 44.

Circulation of the liquid leaching solution through the bed of solids acts to dilute or expand the bed so that the air or gas also present in the system can easily pass through and agitate the bed and bring about chemical homogenity of the solution within the vessel. This method of circulation also provides a means whereby heat can be added to the system if it is needed in addition to classifying and lifting solids through the system.

Valve 65 controls the flow of the coarse and fine solid slurry mixture being ejected from the system via the effluent line 44, thus controlling the effluent pulp fluidity.

In the above description and throughout the specification, the term "solution" is not intended to limit the nature of the liquid passing through the system, but by definition includes any flowable liquid with or without other solids, liquids, gases or other materials dissolved or dispersed therein. A "flowable liquid" includes any material that is liquid over temperature ranges encountered in the autoclave system.

(C) *Solids flow.*—Solids enter the vessel as a slurry via pump 51 and conduit 47 which is in heat exchange relationship with pulp effluent conduit 47 so that the incoming stream is heated by the outgoing stream. Upon entrance into the system near the injection port 19 on the left side of the brick barrier 16, the solids are violently agitated by a double fluidization action of upward flowing air or gas and liquid or solution. In addition to the agitating action imparted to the column of solids on both sides of the brick barrier by the liquid-gas fluidization action, a solids classification is effected which causes the fine, light particles to move upward in the column at a faster rate than the coarse heavy particles. The coarse heavy particles are displaced by more coarse heavy particles to raise them up in compartment 17 over the brick barrier 16 whereupon they gravitate down the other side of the barrier into reaction zone 18 and eventually are removed through coarse pulp effluent port 46.

Fine particles entrained in the liquid collect in the enlarged section 27 of reaction vessel 11. This portion of the system may conveniently be referred to as the clarification cone. The fine solids are constantly moved with the liquid up through section 28 where some of the solids flow through the window 32. These solids then settle on the conical walls of the clarification cone and pass through the space 31 between the bottom or periphery 30 of section 28 and the conical section 25 of wall 12. Then, the solids may return to zones 17 and 18. Other particles are removed from the autoclave via the fine solids drawoff device 39 comprising a shelf or table 40 which may have the configuration of an inverted cone or dish. Slimes which are composed of extremely fine particle size solids may not completely settle in the clarification cone and will be recirculated back through the reaction zones 17 and 18 through circulating solution lines 23 and 24.

In the alternate embodiment of the autoclave vessel, wherein the partition 16 is absent, solids enter the vessel as a slurry via pump 51. As in the compartmented structure, the solids are agitated and moved upwardly in the column by the liquid-gas fluidization action caused by the upward passage of gas and liquid. Displacement of coarse particles in the agitated and fluidized bed by incoming coarse particles causes them, along with the finer particles being bouyed up by the classification effect of uprising solution and gas, to rise in the system to the level of the window 32, to flow into the clarification chamber 27 and thence either back into the undivided reaction vessel or out through a solids removal device, such as 39. By the positioning and structure of the solids drawoff device 39, control can be exercised over the relative size and amount of particles being removed from the system. This device may also be constructed with a variable capacity to control the amount of solids withdrawn during a specific operation or between separate runs.

Solids of a pre-selected particle size may pass through the autoclave at a rate proportional to the length of time needed for effective leaching due to the classifying action, the pattern of flow of solids through the vessel, and the positioning and structure of the drawoff device 39. This principle permits the autoclave to be designed as a more compact unit than would be possible if the entire mixture of solids, regardless of size, had to be retained for the same length of time, as is the case where conventional, non-continuous or batch-type high pressure vessels are used.

The continuous autoclave allows faster and slower reacting solids to be withdrawn from the system continuously and at different rates. The time of retention of all particles of a given size is approximately equal because the particles are agitated in a circular pattern by the rising gas and liquid and travel a long path before reaching the exit ports where they are drawn off. This obviates the need for several small leaching vessels in which materials are treated for different periods.

It is now possible to maintain in the vessel a high proportion of mineral reagent, such as fine pyrite, compared to the amount of coarse solids in the system may be controlled at any given time.

Solids leave the autoclave via conduit 44 under low pressure and as a relatively cool mixture of leached solids and pregnant leach liquor. The size of the solids in the slurry, the temperature and the acidity of the solution all aid in the flocculation and separation of solids from the pregnant leach liquor.

Since most autoclave reactions are exothermic, heat often need not be added to sustain the leaching reaction; however, heat may be added to bring the system up to reaction temperature or to sustain the reaction by means of the heating chamber 58 surrounding the circulating solution lines below the autoclave.

The dimensions of the underground autoclave depend largely on the chemical and physical nature of the ore being treated, the chemistry of the particular process under consideration and the desired capacity. Hence, it is necessary to design the dimension of the system to suit each particular application.

The present process is preferably operated on a continuous basis. In this context, "continuous" does not necessarily mean that there is constant addition and withdrawal of feed slurry, leaching liquid and gas, but rather that there is substantially continuous operation. It will be obvious to those skilled in the art that it may be desirable from time to time to interrupt the addition or withdrawal of one or more materials to adjust the volume in the reaction vessel, to alter the ratio of leaching agents to solids or to change the duration of the leaching. Nonetheless, the preferred method for conducting the process is appropriately described as continuous or substantially continuous.

The following are examples of methods for conducting the method of this invention utilizing apparatus of the type described in the hydro-metallurgical recovery of metallic values from various metal bearing compositions by a continuous leaching process. These examples are included only as an illustration of the invention and they are not intended to limit the invention in any manner.

*Example 1.—Copper sulphide ore*

A coarse (minus 6 mesh) siliceous copper ore containing principally silica and chalcopyrite (3.05% Cu) was leached for 6½ hours with water (about 10 percent solids), under an oxygen partial pressure of approximately 50 p.s.i. and at a temperature of 210° C. The recovery of copper was 91.6 percent and the pH of the pregnant leach solution was 1.5.

*Example 2.—Calcareous copper sulphide ore*

In this test, a minus 10 mesh calcareous copper sulphide ore containing limestone, silica, chalcopyrite, pyrite and some galena was leached with water at 5 percent solids for four hours in an autoclave substantially as described in FIGURE 1, under an oxygen partial pressure of 50 p.s.i. and at a temperature of 210° C. Sixty-nine percent of the contained copper was recovered in this time.

Examples 1 and 2 demonstrate that metal values may be recovered in substantially high yields from low grade ores.

*Example 3.—High grade copper sulphide ore*

The ore used in this test consisted of a minus 14 mesh sulphide copper ore from the Empire Copper Co. Mine of Mackay, Idaho. It contained 16.8 percent copper in a siliceous and somewhat calcareous gangue. This sample was leached with water in the described autoclave at a temperature of approximately 185° C., under an average air pressure of 450 p.s.i. and at a pulp density of approximately 40 percent solids in the reaction zone. The leach reaction did not proceed rapidly until the pH was lowered to 1.5 at which time vigorous reaction was experienced. In approximately one hour of leaching, after the pH of 1.5 was reached, 30 percent of the copper went into solution. Longer leach times are expected to permit recovery of a higher percentage of copper. The leach liquor from this particular test contained 7.96 g./l. Cu, 2.67 g./l. total iron and 16 g./l. $H_2SO_4$.

*Example 4.—Zinc, iron sulphide ore*

A siliceous zinc ore (minus 14 mesh) containing 12.44 percent zinc as ZnS (sphalerite), approximately 10 percent pyrite and about 1 percent Cu as chalcopyrite was leached with water in the described autoclave, at a pulp density of approximately 40 percent, a temperature of 200° C., under average air pressure of 500 p.s.i. and for a leach time of 4½ hours. Extraction of zinc as zinc sulphate in this duration amounted to 49 percent. Substantially complete recovery of the zinc from the ore is accomplished by conducting the reaction for slightly longer periods of time. Free sulphur was not formed in this reaction and the solution obtained was substantially free of iron.

Other sulphide minerals can be leached by the method and apparatus of this invention and include chalcopyrite, pentlandite and pyrite. These materials disassociate in an aqueous solution under elevated oxygen or air pressure and temperatures above 100° C. to form soluble metal sulphates, iron oxides or basic iron sulphates and sulphuric acid. Sulphide minerals with less sulphur can also be employed, e.g., marcasite, pyhorrtite, sphalerite, chalcocite, covellite and bornite. The latter materials require acid conditions in the autoclave before they dissolve to form soluble metal salts, some sulphuric acid and, under certain conditions, free sulphur. Galena can also be treated by the process of this invention and oxidizes readily to insoluble lead sulphate at very moderate reaction conditions.

Inasmuch as sulphide and sulphide-oxide ores often contain chalcopyrite and/or pyrite, the acid needed for leaching them is generated from these minerals in the autoclave. This method also lends itself to recovering gold, silver, extremely fine, pure iron ochre, in addition to accessory metals, such as bismuth and tellurium and many others, in marketable forms.

*Example 5*

A beryllium ore of the following composition was reacted in an autoclave of the type described above:

| | Percent |
|---|---|
| BeO | 0.46 |
| $Al_2O_3$ | 9.0 |
| Fe | 1.20 |
| $SiO_2$ | 53.2 |
| Mn | 0.16 |
| CaO | 14.0 |
| MgO | 3.18 |
| $Na_2O$ | 1.91 |
| F | 3.1 |
| $Co_2$ | 7.9 |
| $K_2O$ | 4.80 |
| LOI | 11.8 |
| Volcanic glass | 40.0 |
| Calcite | 18.0 |
| Quartz | 13.0 |
| Feldspar | 12.0 |
| Hydrated bertrandite | 1.+ |
| Fluorite | 6.0 |
| Clay | 4.0 |
| Cristobalite | 2.0 |
| Gypsum | 2.0 | including traces of sericite, pyroxene, amphibole, biotite, epidote, apatite and dolomite.

*Example 6*

Beryllium ore described above and fine pyrite (minus 48 mesh flotation concentrate) wherein the pyrite contained 43% sulphur were mixed in a ratio of approximately 17.7 to one. Water was added to give a pulp density of approximately 30% solids and the mixture then introduced into the underground autoclave. Higher or lower pulp densities can also be used. The vessel was heated to 195° C. after which 325 pounds of sulphuric acid per ton of ore was injected into the vessel to initiate the pyrite oxidation reaction. The reaction was allowed to continue for 30 minutes at an air pressure of 500 p.s.i. and a temperature of 200° C. Essentially, 100% of the beryllium in the ore was recovered as determined by an assay of both the ore residue and the pregnant leach liquor. Acid in the pregnant leach liquor amounted to 160 pounds per ton of ore. Two hundred and fifty pounds of pyrite per ton of ore was consumed in the manufacture of acid for the leaching of the beryllium ore. Thus, about 400 to 500 pounds of pyrite would be needed to leach each ton of ore. This is opposed to 600 pounds of sulphuric acid required in the case of atmospheric leaching. By leaching in accordance with the present invention, the extremely high purity pregnant liquor produced in the autoclave is recirculated and acid conditions continuously exist in the autoclave so that after initiation of the pyrite oxidation, additional sulphuric acid need not be added to the autoclave. Consequently, pyrite, which is about 1/10 the cost of sulphuric acid at the mine-site, can be sued to provide the leaching agent and heat needed for the reaction. If gold and silver are present in the slime residue, it may be easily recovered thereby permitting a further reduction in the cost of the overall operation.

Because large mesh ore and a low strength solution were used during the leach, slimes were separated in the liquid solids separation step without any difficulty.

The pregnant leach liquor from this example assayed at 1.31 g./l. beryllium oxide, and 0.05 g./l. Fe. Neither aluminum or zinc impurities were detected in the leach liquor. The almost total absence of impurities from this leach liquor makes it very suitable for the precipitation of a pure beryllium product and for recirculation to the vessel after solids removal so as to build up the BeO content even further and reuse the acid in the pregnant liquor.

While there is no evidence as yet that fluorides in the beryllium ore may dissociate and form corrosive solutions or vapors, the solution to this problem, if present, is to use carbon brick lining within the underground autoclave and steel pipe with carbon lining in place of the titanium pipe which is preferred for some applications. Carbon is resistant to the $SiF_4$ vapors which may form in the leaching reaction.

Non-sulphide ores of manganese, copper, zinc and nickel in laterites can also be leached by substantially the same process as described above using an autoclave of the type previously described.

*Example 7*

Pyritic and arsenopyrite gold ores are leached in the autoclave as described in Examples 1 to 5 followed by cyanide leaching for the recovery of gold.

Pyritic or arsenopyritic gold ores are crushed to a minus 10 mesh and then oxidized in the autoclave. Both the arsenic and the iron in the sulphide minerals form insoluble oxide products precipitated from solution under autoclave leach conditions. The gold is then subsequently recovered by cyanide leaching, gravity concentration or amalgamation of the slime or coarse residue products. It should also be noted that both the slime and coarse residue products can be treated in the same manner rather than selecting one or the other for subsequent treatment. Cyanide consuming agents are removed by the acid leaching process. Because the gold is in a substantially purer state and free of most cyanide consuming elements, it responds readily to treatment by any of these techniques or any combination of these techniques. In the case where pyrite is treated and no insoluble arsenates are formed, the slime product constitutes a substantially pure gold concentrate ready for subsequent smelting treatments.

*Example 8.—Gold extraction from pyrite*

Pyrite, containing 0.082 oz. of gold per ton and 2.5 oz. of silver per ton was oxidized in an autoclave of the type described to form sulphuric acid, iron sulphates and ferric oxide. The ferric oxide slime product, which was enriched in gold and silver by a factor of about 2 over that in the original pyrite, was then leached for approximately 24 hours in a 1% NaCN solution to extract the gold and silver. The recoveries for the gold and silver, respectively, were 90.5% and 87.5%.

Example 9.—Acid-ferric sulphate generation

Acid-ferric sulphate was generated from pyrite and a solution of return spent leach liquor in a test wherein 12 liters of water, 2000 grams of ferrous sulphate (98.8% $FeSO_4 \cdot 7HO$) and 200 grams of minus 48 mesh pyrite were added to the autoclave and treated for three hours at 135° C. and 300 p.s.i. air pressure. The solution generated contained 70.6 g./l. $H_2SO_4$, 23.9 g./l. $Fe^{+++}$, 3.4 g./l. $Fe^{++}$ and 83.5 g./l. $SO_4^=$. The ratio of acid produced to pyrite consumed was 2.75 to 1 and the ratio of total reagent ($Fe_2(SO_4)_3 + H_2SO_4$) to pyrite consumed was 10 to 1.

When the initial solution contained variable amounts of ferric sulphate in addition to ferrous sulphate, even higher yields of reagent to pyrite were obtained. An excess of pyrite in the system caused more pyrite to go into solution in proportion to the amount of reagent made from iron sulphates, but caused the iron sulphates in the system to increase over the initial amount. Higher temperatures (170° C.) yielded higher grade acid solutions with lower iron content and increased the rate of acid-ferric sulphate generation. Therefore, it is evident that by control of influencing variables, the desired amount of pyrite can be put into solution with practically any quality iron sulphate spent liquor solution to make a leach solution of the desired acid and ferric sulphate strength. The ratio of reagent produced to pyrite consumed, however, is dependent largely on the quality of the return leach liquor entering the system with the pyrite.

High quality solutions of acid-ferric sulphate produced by the underground autoclave regeneration method may be used for leaching dumps, for treating broken ore underground if conditions warrant, for open drainage leaching on prepared footings or for any of the present standard leaching processes where acidified solutions of ferric sulphate are required. Ores leachable under ordinary atmospheric conditions with acid-ferric sulphate solutions include the oxides and sulphides of copper, uranium, nickel, zinc and many others.

Example 10.—Nickel extraction from laterite ore using pyrite-iron sulphate leach About 1300 grams of minus 80 mesh nickel laterite ore containing 1.34 percent nickel was leached at 30% solids with 200 grams of minus 48 mesh pyrite and a liquor containing 9.5% $FeSO_4$ in an autoclave of the type described. The leaching was conducted at 135° C., under an air pressure of 400 p.s.i. and for a period of 4 hours. About 55% extraction of the nickel was achieved. During the leach, 75 grams of the pyrite went into solution and by so doing, increased the sulphate content of the leach solution by 25% over the initial amount. The final leach solution assayed 46 g./l. $H_2SO_4$, 13.5 g./l. total Fe and 5.75 g./l. $Fe^{++}$. Although the laterite ore contained about 45% Fe, no iron was dissolved. This test indicated that by recycling about 80 percent of the pregnant leach liquor, it would be possible to maintain a high quality, selective, leaching solvent and have a net consumption of only about 75 pounds of pyrite per ton of ore. Higher temperatures would undoubtedly improve the recovery.

This approach to leaching ores in the present autoclave system is very similar to the method used on the beryllium ore wherein pyrite and return leach liquor containing acid were the reagents used to leach the beryllium. In this instance, where a nickel laterite ore was leached, the reagents comprise a smaller amount of pyrite and a considerable amount of reuseable reagent in the form of the acid-iron sulphate return leach liquor. As in the case of the pyrite leach used on beryllium, the applications for the pyrite-iron sulphate leach are wide.

Although the invention has been described by way of example as to certain preferred embodiments, it will be understood that various changes in the method and apparatus may be made without departing from the spirit and scope of the invention as defined in the following claims.

What is claimed is:

1. Apparatus for leaching metal bearing material to recover metal values comprising,
    a substantially vertical elongated reaction vessel capable of withstanding high temperatures and pressures,
    a substantially vertical partition within said vessel, said partition extending upwardly from the bottom of said vessel and terminating at a point below the top of said vessel, said partition serving to divide the lower portion of said vessel into at least two separate sections,
    means for introducing a slurry of particles of said metal bearing material into said vessel,
    means in the bottom part of said vessel for introducing a mixture of gas and liquid leaching agents and for directing said mixture upwardly through said slurry in said vessel to agitate, to leach and to lift up said particles in said vessel,
    means above the partitioned section of said vessel for separating said particles from said liquid leaching agents, after said liquid has passed upwardly through said slurry, thus producing a clarified pregnant leaching liquid,
    means for recirculating said clarified pregnant leaching liquid upwardly through said slurry in said vessel,
    means for withdrawing said slurry from said vessel after leaching of said particles,
    and means for venting excess gas from said vessel.

2. Apparatus as defined in claim 1 further comprising heat exchange means for preheating said slurry before introduction into said vessel by absorbing heat from slurry being withdrawn from said vessel after leaching.

3. Apparatus as defined in claim 1 further comprising means for heating said clarified pregnant leaching liquid before it is recirculated through said slurry.

4. Apparatus as described in claim 1 wherein said means for separating particles from the leaching liquid after the liquid has passed upwardly through said slurry comprises a chamber substantially concentric with respect to the upper portion of said vessel, said chamber having a fluid passage communicating with the interior of said vessel and said passage having means to reject particles of substantial size while readily permitting flow of the leaching liquid.

5. The apparatus as described in claim 4 wherein the means to reject particles of substantial size comprises a screen of suitable mesh size.

6. An apparatus for leaching metal bearing materials to recover metal values comprising,
    a substantially vertical elongated reaction vessel capable of withstanding elevated temperature and pressures,
    a substantially vertical partition within said vessel, said partition extending upwardly from the bottom of said vessel and terminating at a point below the top of said vessel, said partition serving to divide the lower portion of said vessel into at least two separate sections, means for introducing a slurry of said metal bearing material into a first section of said separate sections,
    means in the bottom of said first section for introducing gas and liquid leaching agents, and for directing said mixture upwardly through said slurry in said first section, to agitate, to leach and to lift up the particles, the finer particles being lifted more rapidly by the leaching liquid than the coarse particles and being at least partially entrained in a head of pregnant leach liquor above the main body of the slurry, said coarse particles being lifted more gradually until they reach the top of said partition and then gravitating down into a second section of said separate sections in the lower portion of said vessel, means in the bottom of said second section of said vessel for introducing gas and liquid leaching agents and for directing said mixture upwardly through said second section, means above said partitioned section of said vessel for separating said particles from said liquid leaching agent after said liquid has passed upward through said slurry to produce a clarified pregnant leaching liquid, means to recirculate said clarified pregnant leaching liquid upwardly through said first and second sections, means to withdraw both fine and coarse particles from said vessel, and means to exhaust gases from the upper portion of said vessel above the liquid level.

7. An apparatus for leaching metal bearing materials to recover metal values comprising, a substantially vertical, elongated reaction vessel capable of withstanding elevated temperatures and pressures, a substantially vertical partition within said vessel, said partition extending upwardly from the bottom of said vessel and terminating at a point below the top of said vessel and said partition serving to divide the lower portion of said vessel into at least two separate sections, a first conduit communicating with a first section of said separate sections, means for introducing a slurry of particles of said metal bearing material through said first conduit and into said first section, a second conduit communicating with the bottom part of said first section, means in the bottom part of said vessel for introducing gas and liquid leaching agents through said second conduit and for directing said mixture upwardly through said slurry in said first section to agitate, to leach and to lift up said particles in said slurry, the lighter particles being entrained in the leaching liquid and carried up more rapidly than the coarse particles and forming a head of pregnant, leaching liquid above the main portion of said slurry and the coarser particles being lifted up more gradually until they reach the top of said partition and then gravitate down into a second section of said separate sections, a chamber substantially concentric with said reaction vessel in the region of said head of pregnant liquor, a passage between said chamber and said reaction vessel, means in said passage to permit the circulation of liquid and entrained, finely divided, solid particles into said passage and to reject coarse particles, a collector in the reaction vessel and in the region of said head of pregnant, leaching liquor for removing a slurry of relatively fine solids from said vessel, a conduit in said chamber for recirculating clarified, pregnant, leach liquid for introduction into the bottom of said first and second sections, means in the lower portion of said second section for withdrawing a slurry of coarse solids from said vessel, a third conduit communicating with the lower portions of said second sections, means for introducing mixture of gas and liquid leaching agent through said third conduit upwardly through the coarse solids in said second section, and means to exhaust gas from the upper portion of said vessel above the liquid level.

8. Apparatus as described in claim 7 further comprising a means to heat the clarified, pregnant, leaching liquid before recirculation through said first and second sections.

9. Apparatus as described in claim 7 further comprising means to transfer heat from slurry of particles being withdrawn from said vessel to the slurry of particles being fed into said vessel.

10. Apparatus as described in claim 7 further comprising pumping means for forcing the recirculated clarified, pregnant, leaching liquid upwardly through the slurry in said first and second sections.

11. A leaching method for recovering metal values from metal bearing materials comprising, continuously feeding a slurry containing both coarse and fine particles of a metal bearing material into a substantially vertical reaction vessel capable of withstanding high temperatures and pressures the lower portion of said vessel being partitioned into at least two vertical sections, said feeding being made principally into the first of said sections, continuously introducing a mixture of gas and liquid leaching agents at the bottom of said first section and directing said mixture of leaching agents upwardly through said slurry in said first section to agitate, lift and leach said particles, continuing the feeding of said slurry of fine and coarse particles and the introduction and direction of said mixture of gas and liquid leaching agents until the coarser particles are lifted above the partition separating said vertical sections and gravitate downward in at least one vertical section other than said first section, simultaneously introducing a mixture of gas and liquid leaching agents at the bottom of said other section into which said coarse solids gravitate from said first section, and directing said leaching mixture upwardly through this other section, separating fine particles from the leaching liquid in the upper portion of said vessel above the partitioned section to produce a clarified leaching liquid, collecting and removing at least a portion of said fine particles from said vessel, continuously removing coarse particles from said other section, continuously recirculating said clarified leaching liquid and additional gas upwardly through the particles in said first and other sections, introducing sufficient gas to maintain in said vessel a pressure substantially above atmospheric, and continuously exhausting excess gas from the upper portion of said vessel.

12. A method as described in claim 11 further comprising heating said clarified leaching liquid before recirculating it into said vessel.

13. A method as described in claim 11 further comprising pumping said clarified leaching liquid upwardly through said slurry of particles in said vessel.

14. A method as described in claim 11 further comprising introducing fresh leaching liquid as a component of said slurry.

15. A method according to claim 11 wherein the introduced slurry of particles comprises an ore selected from the group consisting of iron ores, the sulphide ores of copper and the sulphide ores of zinc.

16. A method according to claim 11 wherein said leaching liquid comprises sulphuric acid and ferric sulphate.

References Cited by the Examiner

UNITED STATES PATENTS

| | | | |
|---|---|---|---|
| 912,541 | 2/1909 | Carrick | 75—101 |
| 951,940 | 3/1910 | Crosse | 75—101 |
| 1,119,473 | 12/1914 | Thacher | 75—101 |
| 1,238,951 | 9/1917 | Stannard | 75—101 |
| 2,563,623 | 8/1951 | Scott | 75—104 |
| 2,704,702 | 3/1955 | Pike | 75—101 |
| 2,718,455 | 9/1955 | McCormick | 75—101 |
| 2,740,707 | 4/1956 | Herrmann | 75—101 |
| 2,805,936 | 9/1957 | Schaufelberger | 75—101 |
| 2,916,357 | 12/1959 | Schaufelberger | 75—101 |
| 3,025,131 | 3/1962 | Lerner | 75—101 |
| 3,057,680 | 10/1962 | Schytil et al. | 75—26 |
| 3,061,407 | 10/1962 | Burkin et al. | 75—101 |

DAVID L. RECK, *Primary Examiner.*

N. F. MARKVA, *Assistant Examiner.*